US009336825B2

(12) United States Patent
Wu (10) Patent No.: US 9,336,825 B2
(45) Date of Patent: May 10, 2016

(54) METHOD OF EDITING A VIDEO WITH VIDEO EDITING SOFTWARE EXECUTED ON A COMPUTING DEVICE

(71) Applicant: Arcsoft (Nanjing) Multimedia Technology Company Limited, Nanjing, Jiangsu (CN)

(72) Inventor: Di Wu, Hangzhou (CN)

(73) Assignee: Arcsoft (Nanjing) Multimedia Technology Company Limited, YuHuatai District, Nanjing, Jiangsu (CN)

( * ) Notice: Subject to any disclaimer, the term of this patent is extended or adjusted under 35 U.S.C. 154(b) by 238 days.

(21) Appl. No.: 13/925,756

(22) Filed: Jun. 24, 2013

(65) Prior Publication Data
US 2014/0380168 A1    Dec. 25, 2014

(51) Int. Cl.
G06F 3/0484    (2013.01)
G11B 27/028    (2006.01)
G11B 27/034    (2006.01)
G11B 27/34     (2006.01)

(52) U.S. Cl.
CPC ............. *G11B 27/034* (2013.01); *G11B 27/34* (2013.01); *G06F 3/04847* (2013.01); *G11B 27/028* (2013.01)

(58) Field of Classification Search
CPC  G06F 3/04847; G11B 27/028; G11B 27/034; G11B 27/34
See application file for complete search history.

(56) References Cited

U.S. PATENT DOCUMENTS

| | | | | |
|---|---|---|---|---|
| 5,519,828 | A * | 5/1996 | Rayner | 715/723 |
| 6,597,375 | B1 * | 7/2003 | Yawitz | 715/723 |
| 7,441,193 | B1 * | 10/2008 | Wild et al. | 715/733 |
| 8,004,498 | B1 * | 8/2011 | Meridian | 345/173 |
| 2003/0086686 | A1 * | 5/2003 | Matsui et al. | 386/52 |
| 2005/0216840 | A1 * | 9/2005 | Salvucci | 715/723 |
| 2007/0240062 | A1 * | 10/2007 | Christena et al. | 715/741 |
| 2007/0297751 | A1 * | 12/2007 | Lin | 386/4 |
| 2008/0109751 | A1 * | 5/2008 | Fitzmaurice et al. | 715/793 |
| 2009/0313565 | A1 * | 12/2009 | Kohei | 715/765 |
| 2010/0281376 | A1 * | 11/2010 | Meaney et al. | 715/723 |
| 2011/0116769 | A1 * | 5/2011 | Sugiyama et al. | 386/282 |
| 2011/0258547 | A1 * | 10/2011 | Symons et al. | 715/723 |
| 2012/0210231 | A1 * | 8/2012 | Ubillos et al. | 715/723 |
| 2013/0124990 | A1 * | 5/2013 | Lettau | 715/716 |

OTHER PUBLICATIONS

"Final Cut Pro X User Guide," Apple, Inc., 555 pages, 2012. Chapters 8 and 11 are the relevant sections.*
"Quicktime 7.3 Users Guide," Apple, Inc., 63 pages, 2007. Chapter 3 is the relevant section.*
"Using Adobe Premiere Pro CS5 & CS5.5," Adobe Systems, Inc., 464 pages, Jan. 16, 2012. Chapter 8 is the relevant section.*

* cited by examiner

*Primary Examiner* — Eric J Bycer
(74) *Attorney, Agent, or Firm* — Winston Hsu; Scott Margo (57) ABSTRACT

A method of editing a video with video editing software executed on a computing device includes loading a video clip into the video editing software, the video clip being displayed in a linear video editing frame, displaying a first control icon above or below a beginning portion of the video clip, the first control icon being a first variable icon, and displaying a second control icon above or below an ending portion of the video clip, the second control icon being a second variable icon. The method further includes dragging the first variable icon to modify contents of the beginning portion of the video clip or dragging the second variable icon to modify contents of the ending portion of the video clip.

11 Claims, 12 Drawing Sheets

METHOD OF EDITING A VIDEO WITH VIDEO EDITING SOFTWARE EXECUTED ON A COMPUTING DEVICE

BACKGROUND OF THE INVENTION

1. Field of the Invention

The invention relates to video editing, and more particularly to a method of editing videos using video editing software having a graphical user interface and executed on a computing device.

2. Description of the Prior Art

In conventional video editing software packages, graphical user interfaces (GUIs) are used to provide a way for the user to click on areas of a video clip that the user wishes to modify. However, the video clip is often located in a small area on the user's computer screen, which makes it necessary for the user to use very precise movements when clicking on the GUI of the video editing software package for performing editing functions. If the user makes use of a computer mouse for clicking on the GUI, the user can more easily select the correct locations on the GUI for clicking and dragging. However, even with the precision afforded by the use of a mouse, the user may still make mistakes when clicking since it is often difficult to click at the exact location in a video clip that is desired. When the video clip contains many segments or frames of video, it becomes even more difficult to correctly select the desired location.

With the increasing popularity of touch screens as an input device, more users are now performing tasks using a touch screen and without using a mouse. Using one or more fingers to touch objects in a GUI using a touch screen is much less precise than using a mouse. Even using a stylus for touching objects in the touch screen is less precise than using a mouse in most cases. Therefore, performing video editing while using touch commands on a touch screen is much more difficult than using a mouse.

Therefore, improved video editing software is needed for making it easier for users to edit video by offering larger areas for the user to click on with a mouse or tap with the user's fingers.

SUMMARY OF THE INVENTION

It is therefore one of the primary objectives of the claimed invention to provide an improved method for performing video editing using a GUI.

According to an exemplary embodiment of the claimed invention, a method of editing a video with video editing software executed on a computing device is disclosed. The method includes loading a video clip into the video editing software, the video clip being displayed in a linear video editing frame, displaying a first control icon above or below a beginning portion of the video clip, the first control icon being a first variable icon, and displaying a second control icon above or below an ending portion of the video clip, the second control icon being a second variable icon. The method further includes dragging the first variable icon to modify contents of the beginning portion of the video clip or dragging the second variable icon to modify contents of the ending portion of the video clip.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
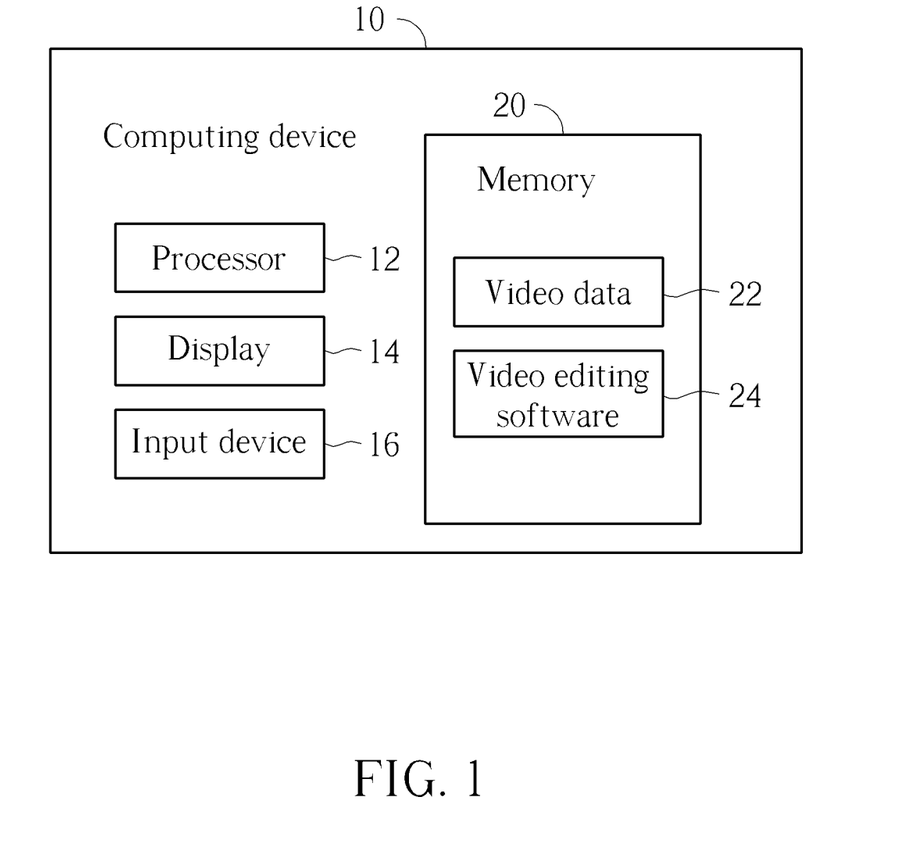
FIG. 1 is a functional block diagram of a computing device 10 according to the present invention.

Please refer to FIG. 1. FIG. 1 is a functional block diagram of a computing device 10 according to the present invention. The computing device 10 contains a processor 12 for executing software commands and controlling operation of the computing device 10. A memory 20 stores video data 22 as well as video editing software 24. The computing device 10 also contains a display 14 for showing the video editing software 24 on a graphical user interface (GUI), and an input device 16 for allowing the user to control the video editing software 24 for editing the video data 22. The processor 12 executes the functions of the video editing software 24.

The computing device 10 of the present invention may be any device that offers the user the ability to click on, tap on, or otherwise select items in a GUI. The computing device 10 may be a tablet computer, a desktop computer, a notebook computer, a smart phone, or other similar devices. Although the present invention preferably makes use of a computer mouse or a touch screen for serving as the input device 16 for the user, other input devices can be used as well such as a computer keyboard, joystick, or gaming pad.

Figure 2:
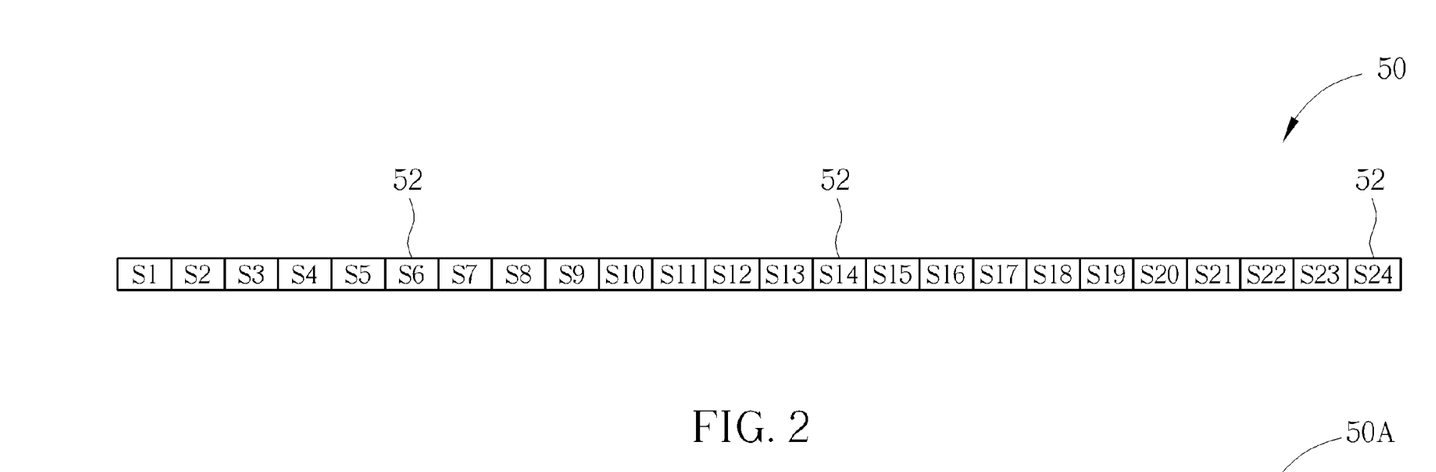
FIG. 2 illustrates a video clip loaded into the video editing software and displayed in a linear video editing frame.

Please refer to FIG. 2. FIG. 2 illustrates a video clip 50 loaded into the video editing software 24 and displayed in a linear video editing frame. The video clip 50 contains a plurality of video segments 52. Although 24 video segments 52 numbered from S1 to S24 are shown in FIG. 2, the video clip 50 can have any number of video segments 52. The video clip 50 can also be thought of as being divided into video frames, where the video segments 52 can contain one or more video frames.

Figure 3:
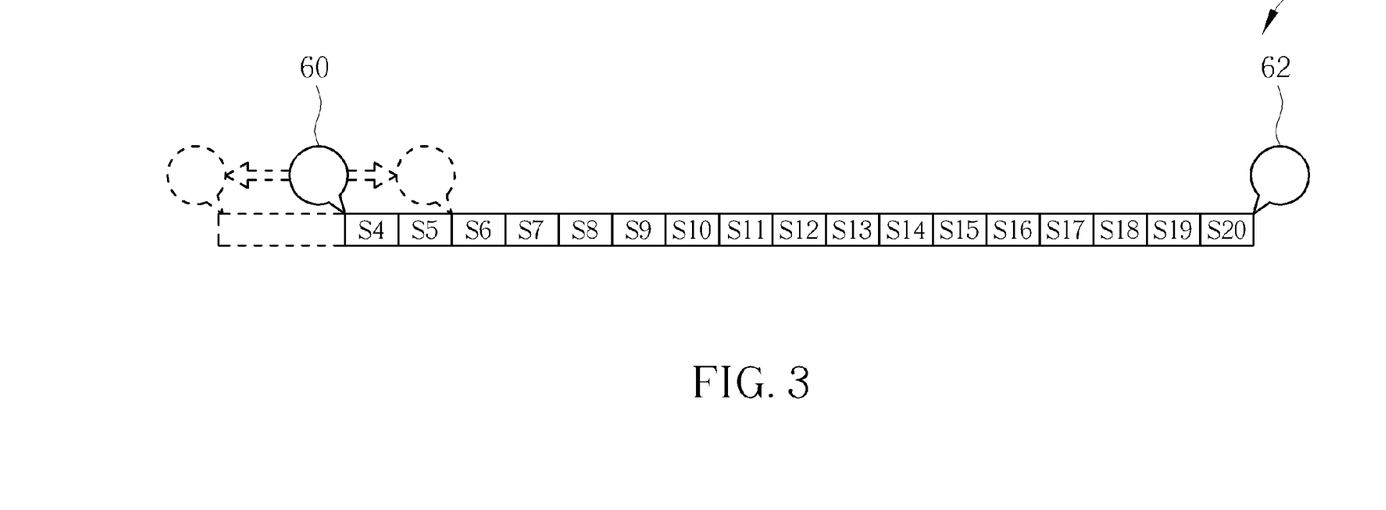
FIGS. 3-5 illustrate extending or removing a beginning portion of the video clip by dragging the beginning of the video clip.
Figure 9:
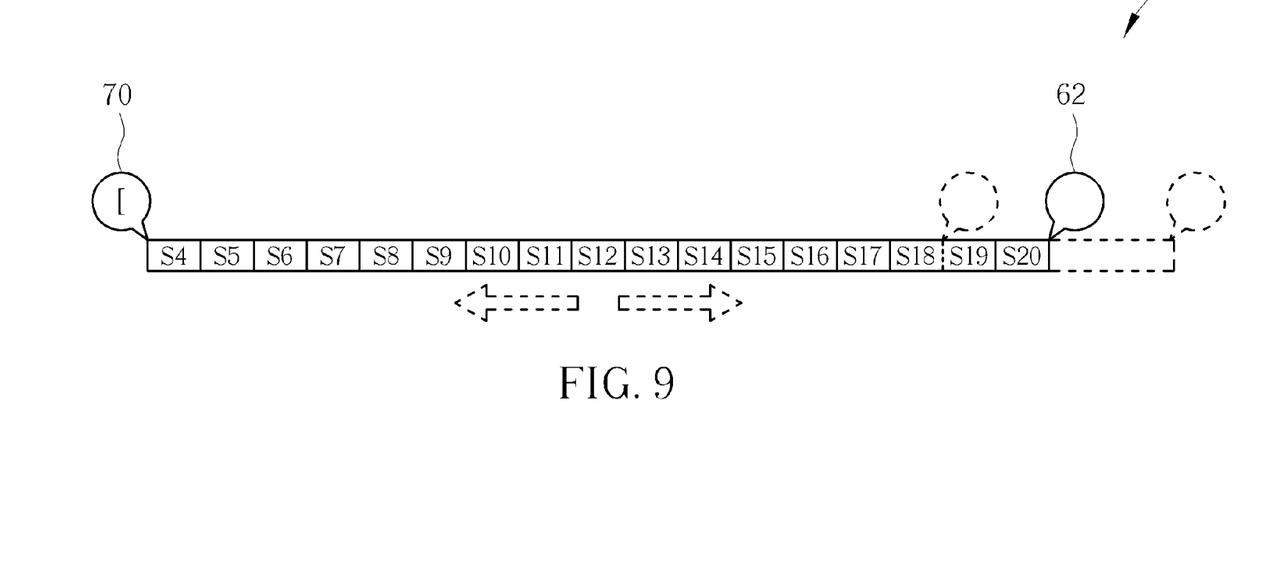
FIGS. 9-11 illustrate extending or removing a beginning portion of the video clip by dragging the ending of the video clip.
Figure 12:
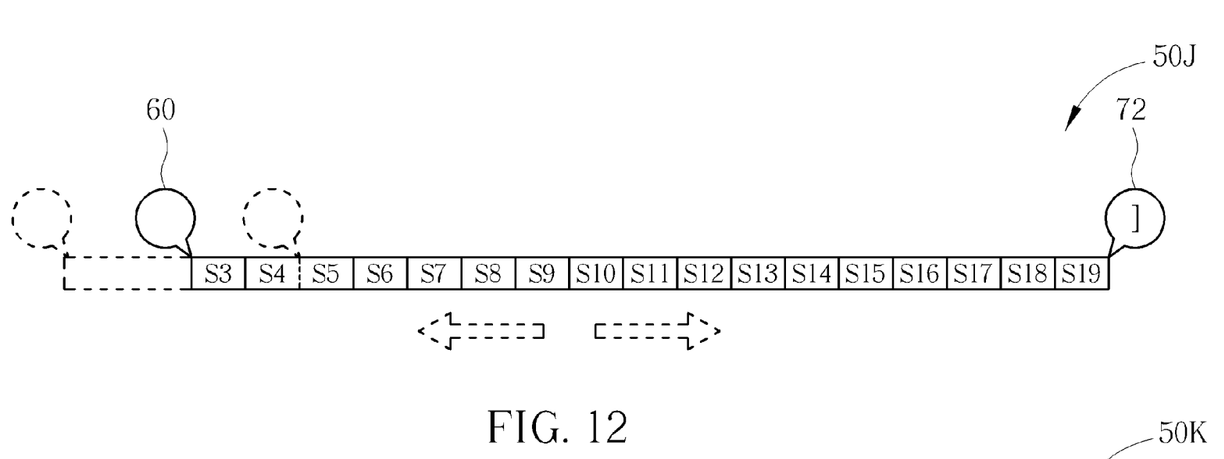
FIGS. 12-14 illustrate extending or removing an ending portion of the video clip by dragging the beginning of the video clip.

Please refer to FIG. 3. FIG. 3 shows a video clip 50A, which is a subset of the video clip 50 shown in FIG. 2. As illustrated, the video clip 50A contains video segments 52 numbered from S4 to S20. To make it easier to edit the starting and stopping positions of videos, a first control icon can be used to indicate the current starting position of the video clip 50A and a second control icon can be used to indicate the current ending position of the video clip 50A. The first control icon can either be a first variable icon 60 as shown in FIG. 3, or can be a first fixed icon 70, as shown in FIG. 9. Likewise, the second control icon can either be a second variable icon 62 as shown in FIG. 3, or can be a second fixed icon 72, as shown in FIG. 12.

The first variable icon 60 and the second variable icon 62 can both be moved to different positions, whereas the first fixed icon 70 and the second fixed icon 72 cannot be moved and are located in fixed and constant positions. The first control icon can be toggled between the first variable icon 60 and the first fixed icon 70 by simply clicking or tapping on the first control icon. Similarly, the second control icon can be toggled between the second variable icon 62 and the second fixed icon 72 by simply clicking or tapping on the second control icon. Since tapping with a finger on a touch screen is functionally equivalent to clicking with a mouse, the following description will use the term "tapping" for the sake of brevity, and the term "tapping" also covers the action of "clicking" with a mouse.

Figure 4:
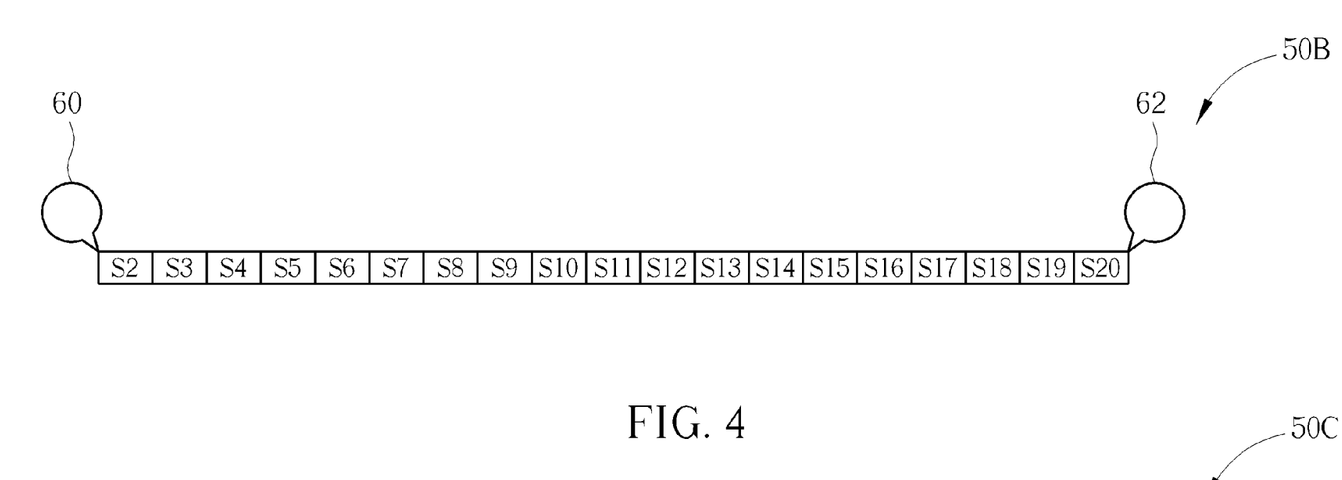
Figure 5:
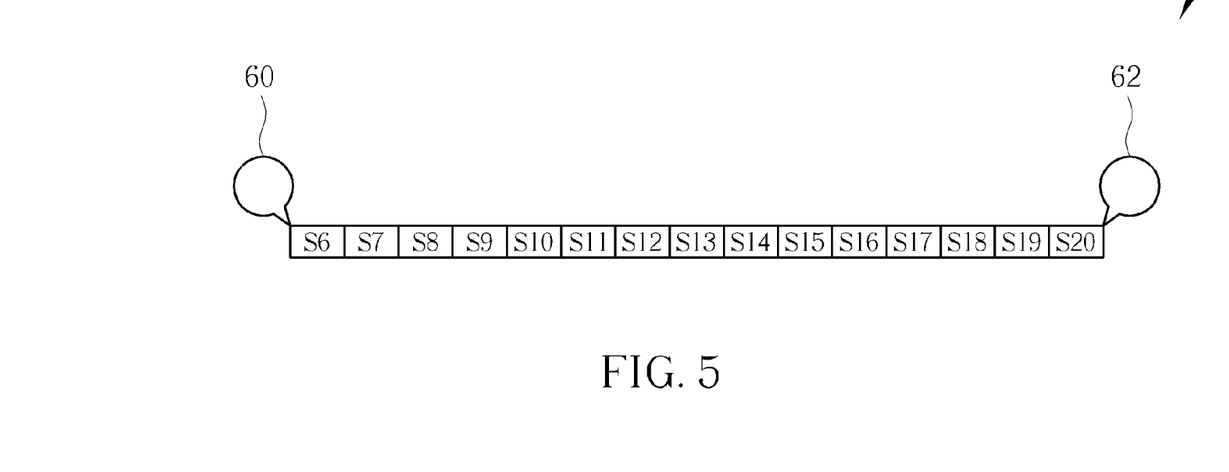

Please refer to FIGS. 3-5. As shown in FIG. 3, the first variable icon 60 can be dragged either left or right. FIG. 4 shows a result of dragging the first variable icon 60 to the left. The result of this action is the video clip 50A shown in FIG. 3 becomes the video clip 50B of FIG. 4, in which the beginning portion of the video clip 50B has been extended. The video clip 50B now contains video segments 52 numbered from S2 to S20 instead of the video segments 52 numbered from S4 to S20 in the video clip 50A. FIG. 5 shows a result of dragging the first variable icon 60 to the right. The result of this action is the video clip 50A shown in FIG. 3 becomes the video clip 50C of FIG. 5, in which the beginning portion of the video clip 50C has been trimmed. The video clip 50C now contains video segments 52 numbered from S6 to S20 instead of the video segments 52 numbered from S4 to S20 in the video clip 50A.

Figure 6:
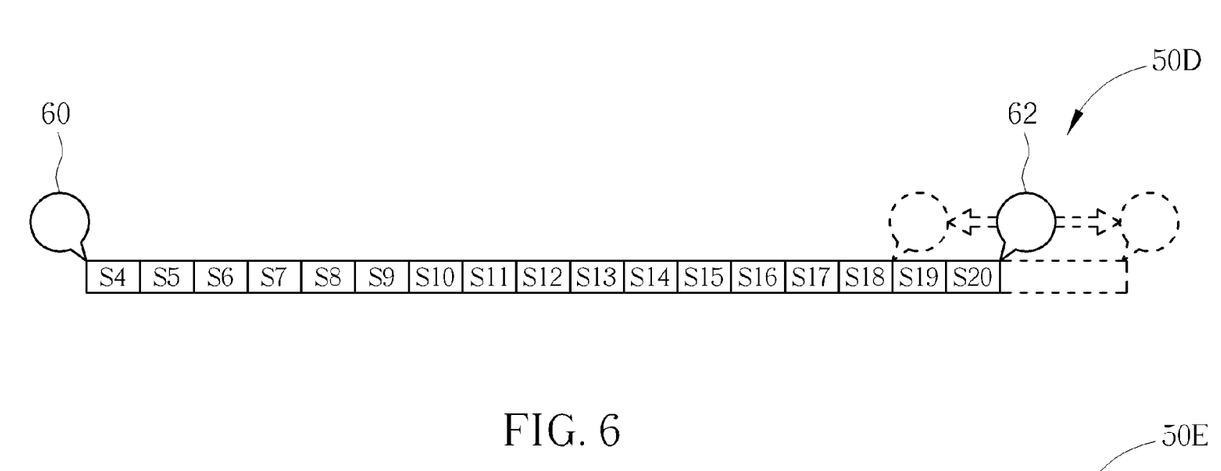
FIGS. 6-8 illustrate extending or removing an ending portion of the video clip by dragging the ending of the video clip.
Figure 7:
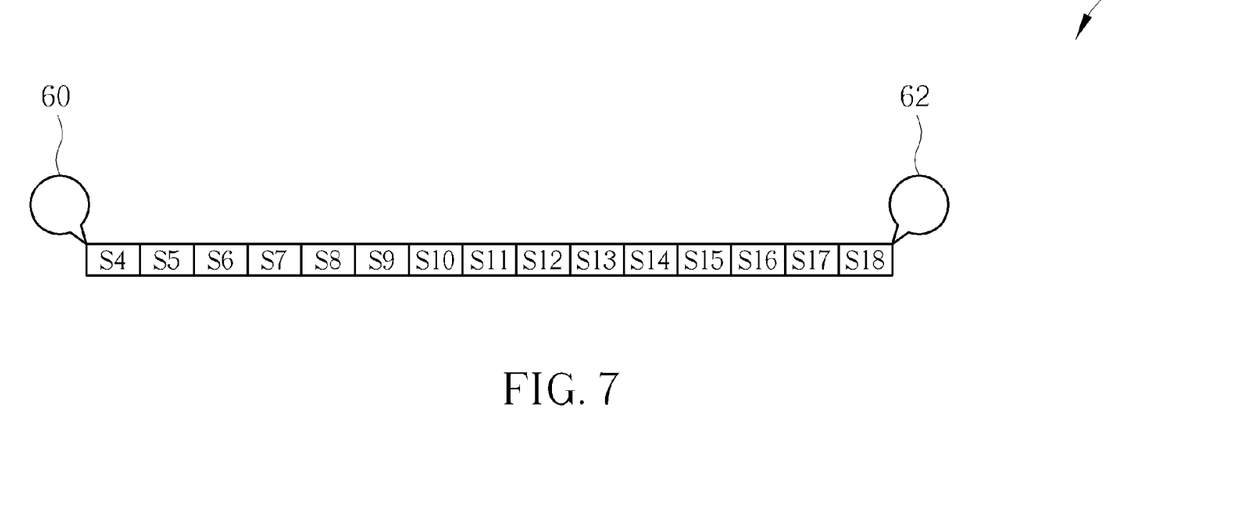
Figure 8:
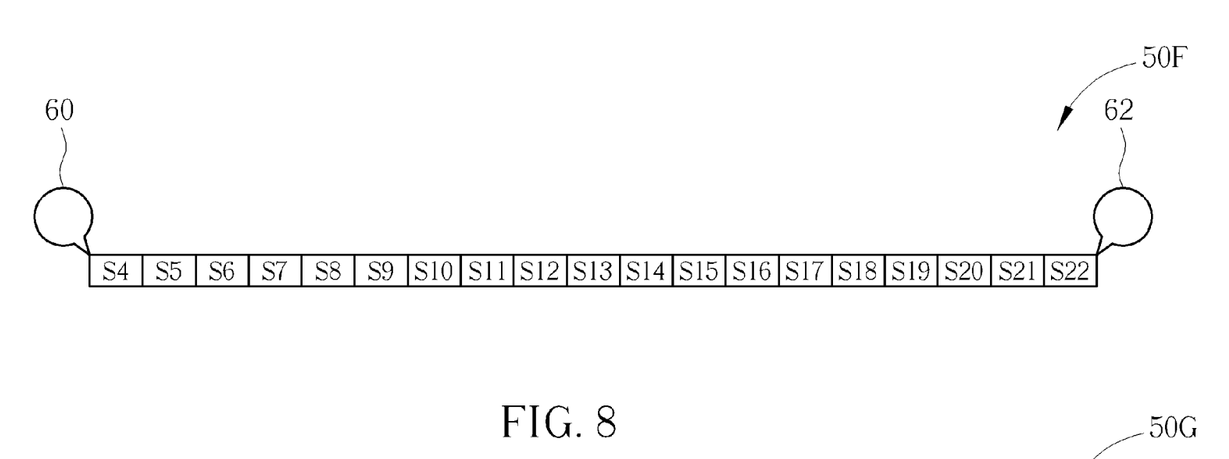

Please refer to FIGS. 6-8. FIG. 6 shows a video clip 50D, which is a subset of the video clip 50 shown in FIG. 2. The video clip 50D contains video segments 52 numbered from S4 to S20, and is shown as having the first variable icon 60 and the second variable icon 62. As shown in FIG. 6, the second variable icon 62 can be dragged either left or right. FIG. 7 shows a result of dragging the second variable icon 62 to the left. The result of this action is the video clip 50D shown in FIG. 6 becomes the video clip 50E of FIG. 7, in which the ending portion of the video clip 50E has been trimmed. The video clip 50E now contains video segments 52 numbered from S4 to S18 instead of the video segments 52 numbered from S4 to S20 in the video clip 50D. FIG. 8 shows a result of dragging the second variable icon 62 to the right. The result of this action is the video clip 50D shown in FIG. 6 becomes the video clip 50F of FIG. 8, in which the ending portion of the video clip 50F has been extended. The video clip 50F now contains video segments 52 numbered from S4 to S22 instead of the video segments 52 numbered from S4 to S20 in the video clip 50D.

Thus, when both the first variable icon 60 and the second variable icon 62 are present on the video clip 50A, dragging the first variable icon 60 either left or right respectively extends or trims the beginning portion of the video clip 50A without affecting the ending portion of the video clip. On the other hand, when both the first variable icon 60 and the second variable icon 62 are present on the video clip 50D, dragging the second variable icon 62 either left or right respectively trims or extends the ending portion of the video clip 50D without affecting the beginning portion of the video clip. Subsets of the video clip 50 can thus be created by dragging the first variable icon 60 or the second variable icon 62 accordingly.

Figure 10:
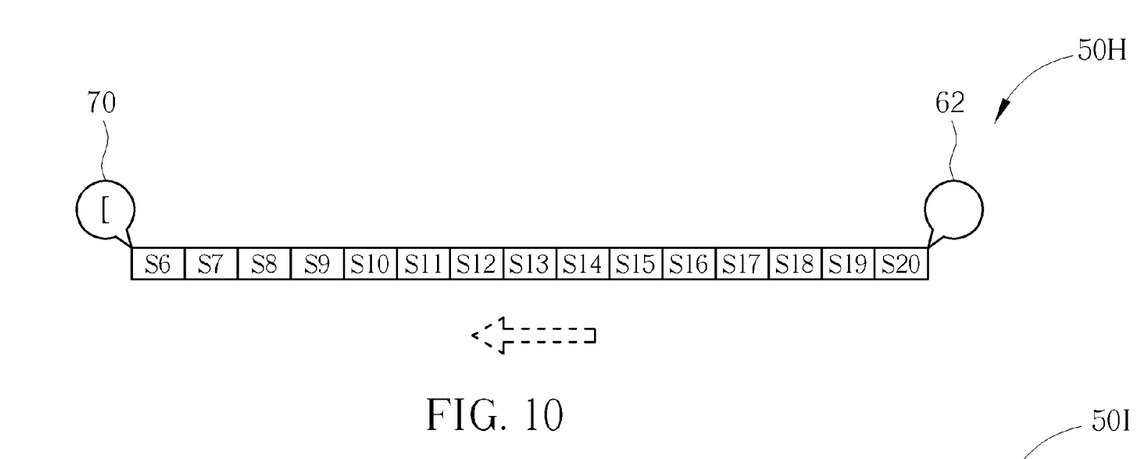
Figure 11:
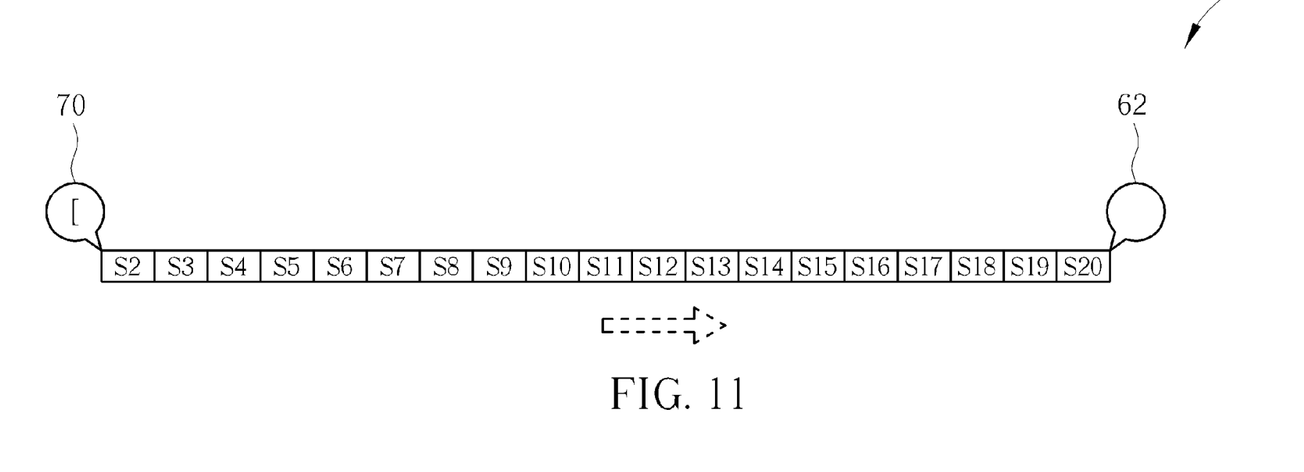

Please refer to FIGS. 9-11. FIG. 9 shows a video clip 50G, which is a subset of the video clip 50 shown in FIG. 2. The video clip 50G contains video segments 52 numbered from S4 to S20, and is shown as having the first fixed icon 70 and the second variable icon 62. When the video clip 50G contains the first fixed icon 70 and the second variable icon 62, the first fixed icon 70 operates like a recycle bin or a paper shredder. As shown in FIG. 9, the video clip 50G can be dragged either left or right. FIG. 10 shows a result of dragging the video clip 50G to the left. The result of this action is the video clip 50G shown in FIG. 9 becomes the video clip 50H of FIG. 10, in which the beginning portion of the video clip 50H has been trimmed. The video clip 50H now contains video segments 52 numbered from S6 to S20 instead of the video segments 52 numbered from S4 to S20 in the video clip 50G. As the video clip 50G is dragged to the left, the beginning portion of the video clip 50H can be thought of as entering the recycle bin or paper shredder. FIG. 11 shows a result of dragging the video clip 50G to the right. The result of this action is the video clip 50G shown in FIG. 9 becomes the video clip 50I of FIG. 11, in which the beginning portion of the video clip 50I has been extended. The video clip 50I now contains video segments 52 numbered from S2 to S20 instead of the video segments 52 numbered from S4 to S20 in the video clip 50G. As the video clip 50G is dragged to the right, the beginning portion of the video clip 50I can be thought of as coming out of the recycle bin or paper shredder.

Figure 13:
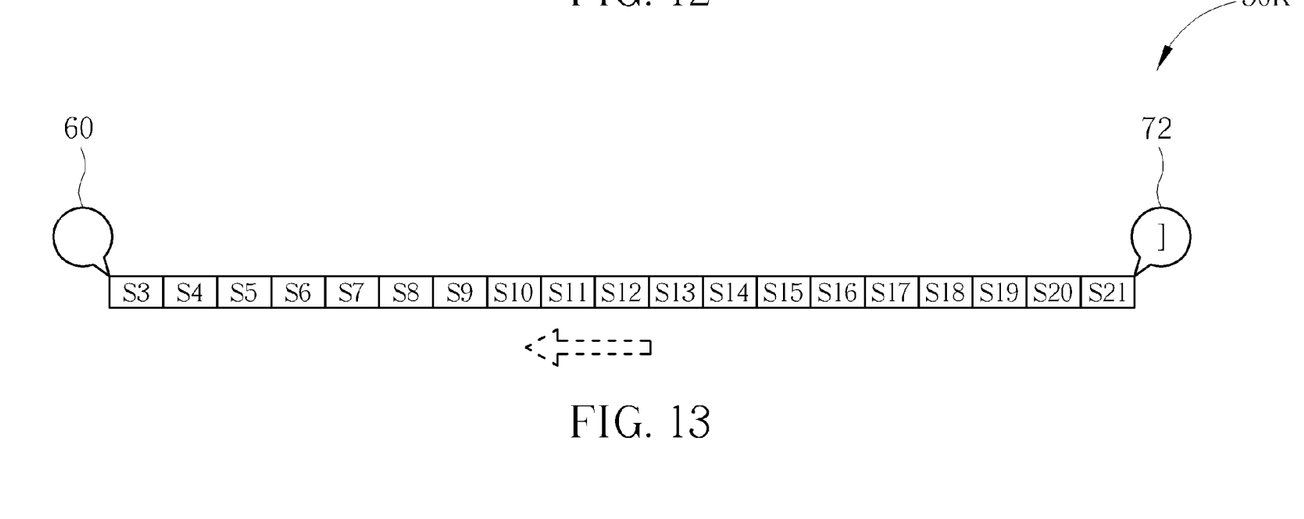
Figure 14:
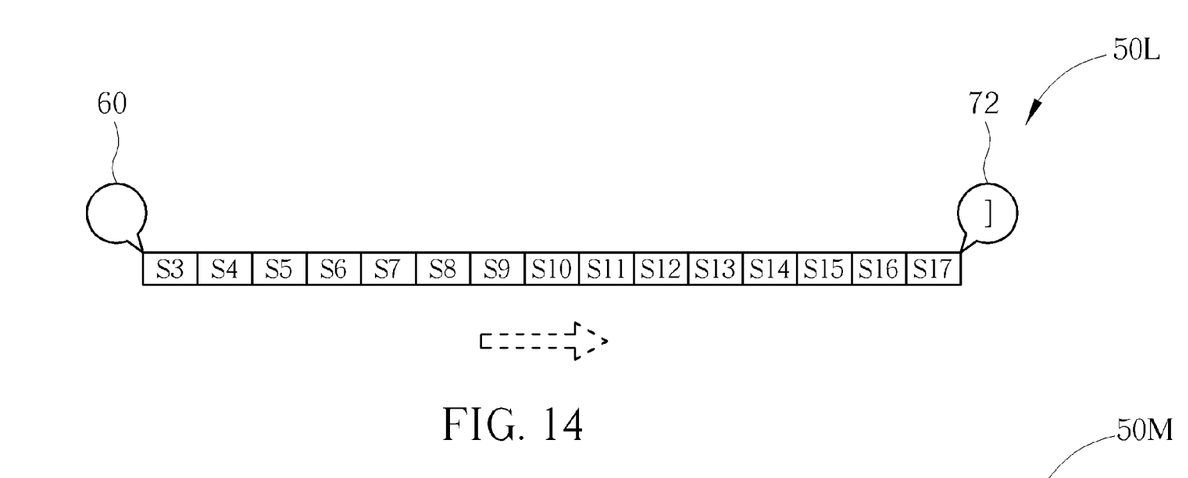

Please refer to FIGS. 12-14. FIG. 12 shows a video clip 50J, which is a subset of the video clip 50 shown in FIG. 2. The video clip 50J contains video segments 52 numbered from S3 to S19, and is shown as having the first variable icon 60 and the second fixed icon 72. When the video clip 50J contains the first variable icon 60 and the second fixed icon 72, the second fixed icon 72 operates like a recycle bin or a paper shredder. As shown in FIG. 12, the video clip 50J can be dragged either left or right. FIG. 13 shows a result of dragging the video clip 50J to the left. The result of this action is the video clip 50J shown in FIG. 12 becomes the video clip 50K of FIG. 13, in which the ending portion of the video clip 50K has been extended. The video clip 50K now contains video segments 52 numbered from S3 to S21 instead of the video segments 52 numbered from S3 to S19 in the video clip 50J. As the video clip 50J is dragged to the left, the ending portion of the video clip 50K can be thought of as coming out of the recycle bin or paper shredder. FIG. 14 shows a result of dragging the video clip 50J to the right. The result of this action is the video clip 50J shown in FIG. 12 becomes the video clip 50L of FIG. 14, in which the ending portion of the video clip 50L has been trimmed. The video clip 50L now contains video segments 52 numbered from S3 to S17 instead of the video segments 52 numbered from S3 to S19 in the video clip 50J. As the video clip 50J is dragged to the right, the ending portion of the video clip 50L can be thought of as entering the recycle bin or paper shredder.

Figure 15:
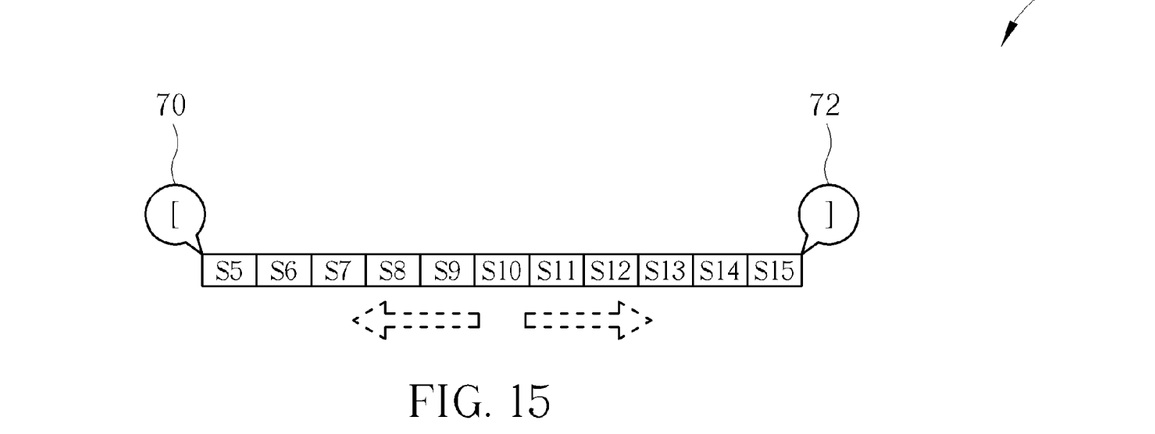
FIGS. 15-17 illustrate shifting the contents of the video clip either left or right.
Figure 16:
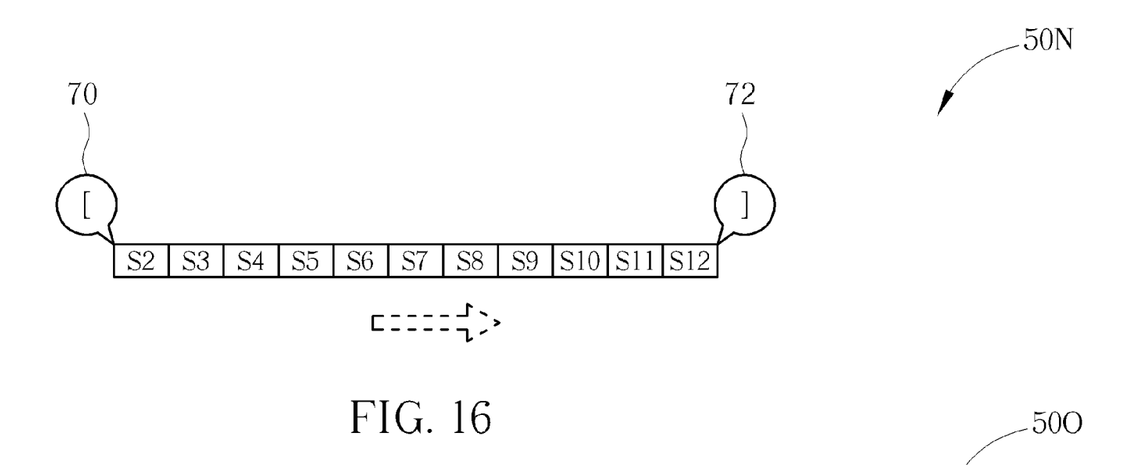
Figure 17:
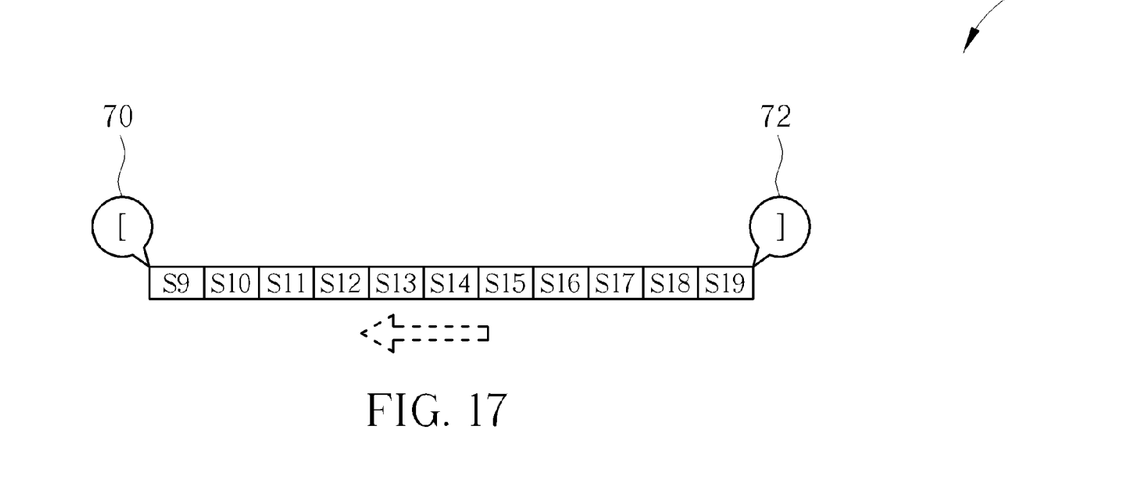

Please refer to FIGS. 15-17. FIG. 15 shows a video clip 50M, which is a subset of the video clip 50 shown in FIG. 2. The video clip 50M contains video segments 52 numbered from S5 to S15, and is shown as having the first fixed icon 70 and the second fixed icon 72. When the video clip 50M contains the first fixed icon 70 and the second fixed icon 72, the video clip 50M can be dragged left or right for changing the contents of the video clip 50M contained between the first fixed icon 70 and the second fixed icon 72. FIG. 16 shows a result of dragging the video clip 50M to the right. The result of this action is the video clip 50M shown in FIG. 15 becomes the video clip 50N of FIG. 16, in which the entire contents of the video clip 50N has been shifted towards the right. That is, earlier portions of the video clip 50N are moved to being between the first fixed icon 70 and the second fixed icon 72 and later portions of the video clip 50M are removed. The video clip 50N now contains video segments 52 numbered from S2 to S12 instead of the video segments 52 numbered from S5 to S15 in the video clip 50M. As the video clip 50M is dragged to the right, the ending portion of the video clip 50M can be thought of as entering a recycle bin or paper shredder, whereas the beginning portion of the video clip 50M can be thought of as coming out of a recycle bin or paper shredder. FIG. 17 shows a result of dragging the video clip 50M to the left. The result of this action is the video clip 50M shown in FIG. 15 becomes the video clip 50O of FIG. 17, in which the entire contents of the video clip 50N has been shifted towards the left. That is, later portions of the video clip 50N are moved to being between the first fixed icon 70 and the second fixed icon 72 and earlier portions of the video clip 50M are removed. The video clip 50O now contains video segments 52 numbered from S9 to S19 instead of the video segments 52 numbered from S5 to S15 in the video clip 50M. As the video clip 50M is dragged to the left, the beginning portion of the video clip 50M can be thought of as entering a recycle bin or paper shredder, whereas the ending portion of the video clip 50M can be thought of as coming out of a recycle bin or paper shredder.

Figure 18:
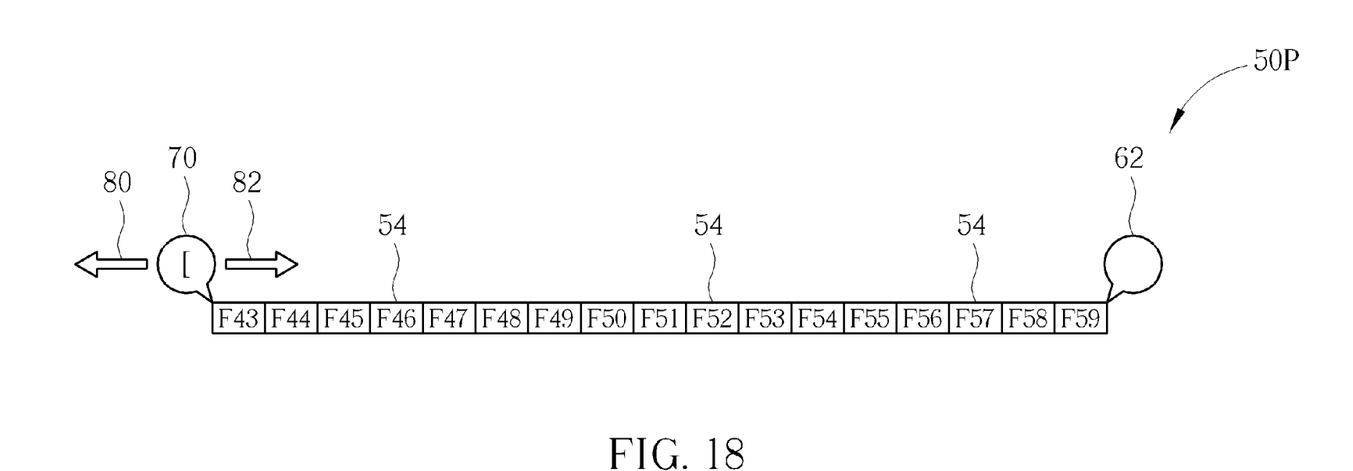
FIGS. 18-20 illustrate extending or removing a beginning portion of the video clip one frame at a time.
Figure 19:
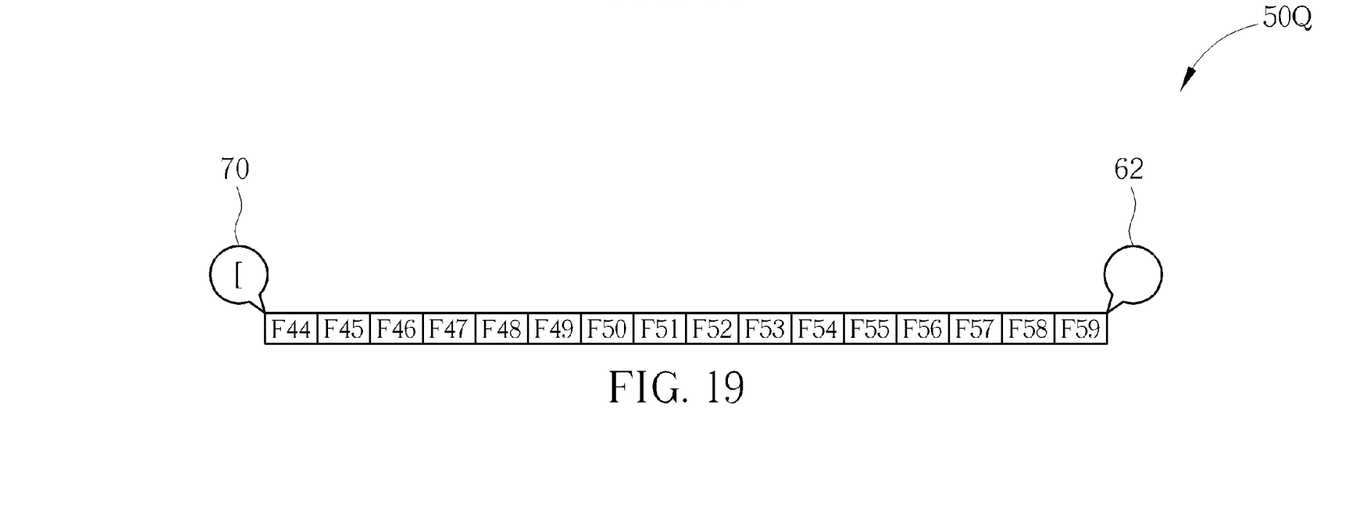
Figure 20:
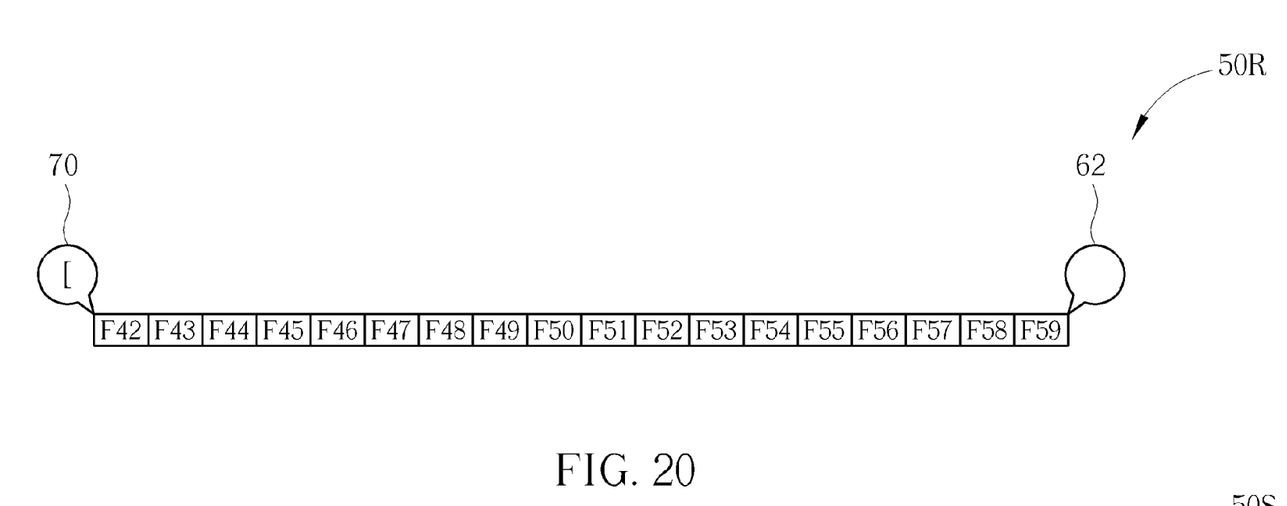

Please refer to FIGS. 18-20. FIG. 18 shows a video clip 50P, which is divided into video frames 54 instead of video segments. The video clip 50P contains video frames 54 numbered from F43 to F59, and is shown as having the first fixed icon 70 and the second variable icon 62. In this embodiment, a first left arrow 80 is displayed immediately to the left of the first fixed icon 70 and a first right arrow 82 is displayed immediately to the right of the first fixed icon 70. Differing from FIGS. 9-11, in the embodiment shown in FIGS. 18-20, a user may click on the first left arrow 80 or the first right arrow 82 to modify the contents of the video clip 50P one frame at a time. Thus, frame-by-frame video editing can be provided. Since the video clip 50P contains the first fixed icon 70 and the second variable icon 62, the first fixed icon 70 operates like a recycle bin or a paper shredder. FIG. 19 shows a result of tapping the first left arrow 80 once. The result of this action is the video clip 50P shown in FIG. 18 becomes the video clip 50Q of FIG. 19, in which the first video frame 54 of the beginning portion of the video clip 50Q has been trimmed. The video clip 50Q now contains video frames 54 numbered from F44 to F59 instead of the video frames 54 numbered from F43 to F59 in the video clip 50P. As the first left arrow 80 is tapped, the beginning portion of the video clip 50Q can be thought of as entering the recycle bin or paper shredder. FIG. 20 shows a result of tapping the first right arrow 82 once. The result of this action is the video clip 50P shown in FIG. 18 becomes the video clip 50R of FIG. 20, in which the beginning portion of the video clip 50R has been extended by one video frame 54. The video clip 50R now contains video frames 54 numbered from F42 to F59 instead of the video frames 54 numbered from F43 to F59 in the video clip 50P. As the first right arrow 82 is tapped, the beginning portion of the video clip 50R can be thought of as coming out of the recycle bin or paper shredder.

Figure 21:
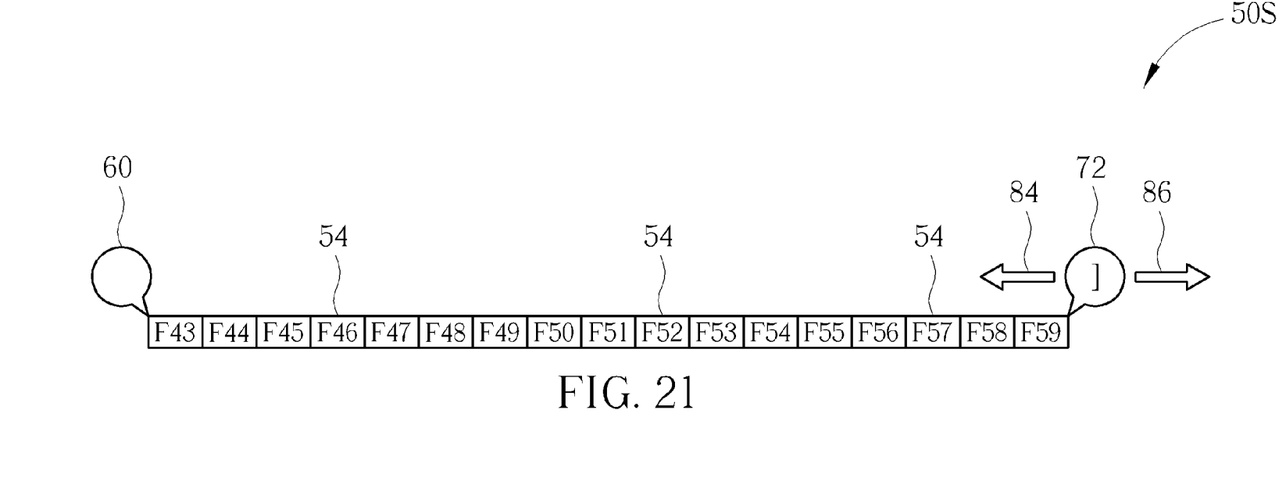
FIGS. 21-23 illustrate extending or removing an ending portion of the video clip one frame at a time.
Figure 22:
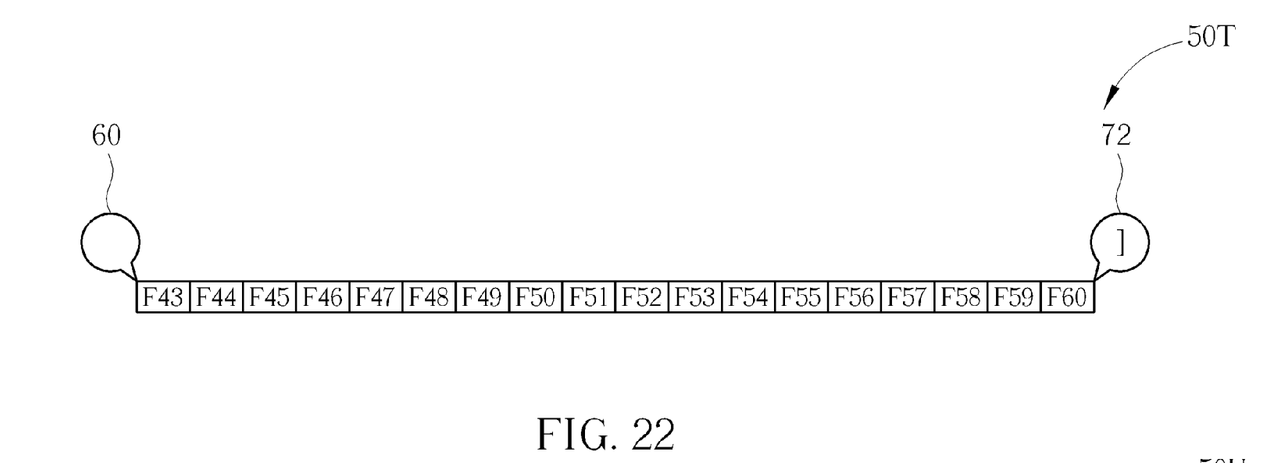
Figure 23:
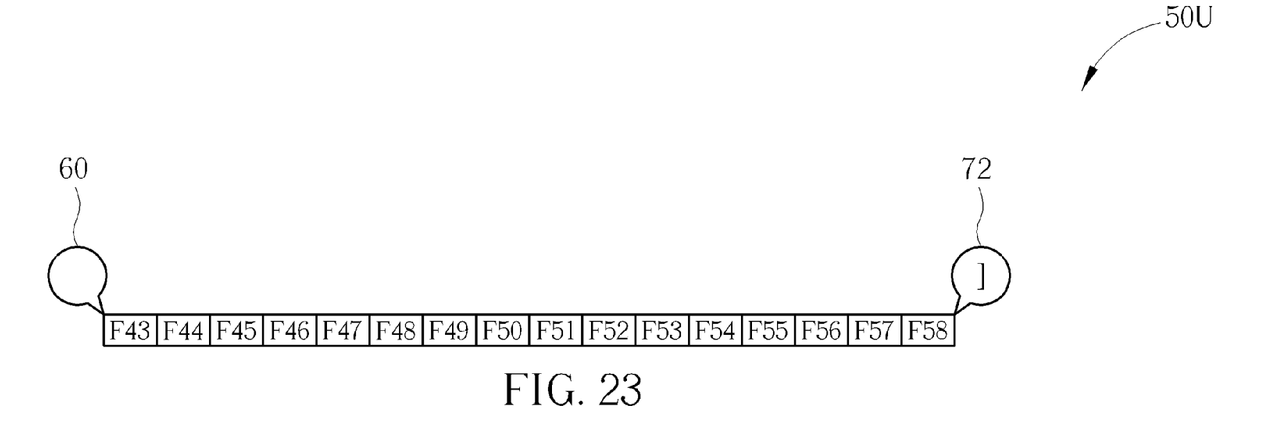

Please refer to FIGS. 21-23. FIG. 21 shows a video clip 50S, which is also divided into video frames 54. The video clip 50S contains video frames 54 numbered from F43 to F59, and is shown as having the first variable icon 60 and the second fixed icon 72. In this embodiment, a second left arrow 84 is displayed immediately to the left of the second fixed icon 72 and a second right arrow 86 is displayed immediately to the right of the second fixed icon 72. Differing from FIGS. 12-14, in the embodiment shown in FIGS. 21-23, a user may click on the second left arrow 84 or the second right arrow 86 to modify the contents of the video clip 50P one frame at a time. Thus, frame-by-frame video editing can be provided. Since the video clip 50S contains the first variable icon 60 and the second fixed icon 72, the second fixed icon 72 operates like a recycle bin or a paper shredder. FIG. 22 shows the result of tapping the second left arrow 84 once. The result of this action is the video clip 50S shown in FIG. 21 becomes the video clip 50T of FIG. 22, in which the ending portion of the video clip 50T has been extended by one video frame 53. The video clip 50T now contains video frames 54 numbered from F43 to F60 instead of the video frames 54 numbered from F43 to F59 in the video clip 50S. FIG. 23 shows a result of tapping the second right arrow 86 once. The result of this action is the video clip 50S shown in FIG. 21 becomes the video clip 50U of FIG. 23, in which the last video frame 54 of the ending portion of the video clip 50U has been trimmed. The video clip 50U now contains video frames 54 numbered from F43 to F58 instead of the video frames 54 numbered from F43 to F59 in the video clip 50S. As the second right arrow 86 is tapped, the ending portion of the video clip 50U can be thought of as entering the recycle bin or paper shredder.

The present invention provides the user with an interface that is easier to operate by touching a touch screen, operating a computer mouse, or through other input devices. The first variable icon 60, the second variable icon 62, the first fixed icon 70, the second fixed icon 72, the first left arrow 80, the first right arrow 82, the second left arrow 84, the second right arrow 86, and the video clip 50M shown in FIG. 16 can all easily be tapped or dragged by the user operating the video editing software 24 by touching a touch screen, and can be easily clicked and dragged by a computer mouse as well. Although the first variable icon 60, the second variable icon 62, the first fixed icon 70, the second fixed icon 72, the first left arrow 80, the first right arrow 82, the second left arrow 84, and the second right arrow 86 are all shown as being located above their respective video clips, these control items can also be located below their respective video clips as well. Since the area that the user can touch in these control items is larger than that provided in traditional video editing software, the present invention offers a distinct improvement that makes editing videos easier for all users, regardless of their choice of input device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of editing a video with video editing software executed on a computing device, the method comprising:
   loading a video clip into the video editing software, the video clip being displayed in a linear video editing frame;
   displaying a first control icon above or below a beginning portion of the video clip, the first control icon being a first variable icon;
   displaying a second control icon above or below an ending portion of the video clip, the second control icon being a second variable icon;
   dragging the first variable icon to modify contents of the beginning portion of the video clip or dragging the second variable icon to modify contents of the ending portion of the video clip;
   tapping the first control icon to toggle between the first variable icon and a first fixed icon; and tapping the second control icon to toggle between the second variable icon and a second fixed icon;

wherein the first variable icon and the second variable icon are movable in a left direction or a right direction, and the first fixed icon and the second fixed icon are not movable in the left direction or the right direction.

2. The method of claim 1, wherein dragging the first variable icon to the left extends the beginning portion of the video clip, and dragging the first variable icon to the right trims the beginning portion of the video clip.

3. The method of claim 1, wherein dragging the second variable icon to the left trims the ending portion of the video clip, and dragging the second variable icon to the right extends the ending portion of the video clip.

4. The method of claim 1, wherein when the first control icon is the first fixed icon and the second control icon is the second variable icon, the method further comprising:

dragging the video clip displayed in the linear video editing frame to the left to trim the beginning portion of the video clip or dragging the video clip displayed in the linear video editing frame to the right to extend the beginning portion of the video clip;

wherein only the beginning portion of the video clip is modified, the ending portion of the video clip is not modified, and a location of the first fixed icon on a timeline in the linear video editing frame is constant.

5. The method of claim 1, wherein when the first control icon is the first variable icon and the second control icon is the second fixed icon, the method further comprising:

dragging the video clip displayed in the linear video editing frame to the left to extend the ending portion of the video clip or dragging the video clip displayed in the linear video editing frame to the right to trim the ending portion of the video clip;

wherein only the ending portion of the video clip is modified, the beginning portion of the video clip is not modified, and a location of the second fixed icon on a timeline in the linear video editing frame is constant.

6. The method of claim 1, wherein when the first control icon is the first fixed icon and the second control icon is the second fixed icon, the method further comprising:

dragging the video clip displayed in the linear video editing frame to the left or the right to change contents of the video clip contained between the first fixed icon and the second fixed icon.

7. The method of claim 6, wherein dragging the video clip displayed in the linear video editing frame to the right moves earlier portions of the video clip to be between the first fixed icon and the second fixed icon and removes later portions of the video clip, and dragging the video clip displayed in the linear video editing frame to the left moves later portions of the video clip to be between the first fixed icon and the second fixed icon and removes earlier portions of the video clip.

8. The method of claim 1, wherein when the first control icon is the first fixed icon and the second control icon is the second variable icon, the method further comprising:

displaying a first left arrow immediately to the left of the first fixed icon and a first right arrow immediately to the right of the first fixed icon; and tapping on the first left arrow to trim the beginning portion of the video clip by a single frame or tapping on the first right arrow to extend the beginning portion of the video clip by a single frame;

wherein only the beginning portion of the video clip is modified, the ending portion of the video clip is not modified, and a location of the first fixed icon on a timeline in the linear video editing frame is constant.

9. The method of claim 1, wherein when the first control icon is the first variable icon and the second control icon is the second fixed icon, the method further comprising:

displaying a second left arrow immediately to the left of the first second fixed icon and a second right arrow immediately to the right of the first second fixed icon; and tapping on the second left arrow to extend the ending portion of the video clip by a single frame or tapping on the second right arrow to trim the ending portion of the video clip by a single frame;

wherein only the ending portion of the video clip is modified, the beginning portion of the video clip is not modified, and a location of the second fixed icon on a timeline in the linear video editing frame is constant.

10. The method of claim 1, wherein the first control icon is displayed above the beginning portion of the video clip and the second control icon is displayed above the ending portion of the video clip.

11. The method of claim 1, wherein a user of the video editing software controls operation of the video editing software using a touch screen.

\* \* \* \* \*